United States Patent Office 3,302,591
Patented Feb. 7, 1967

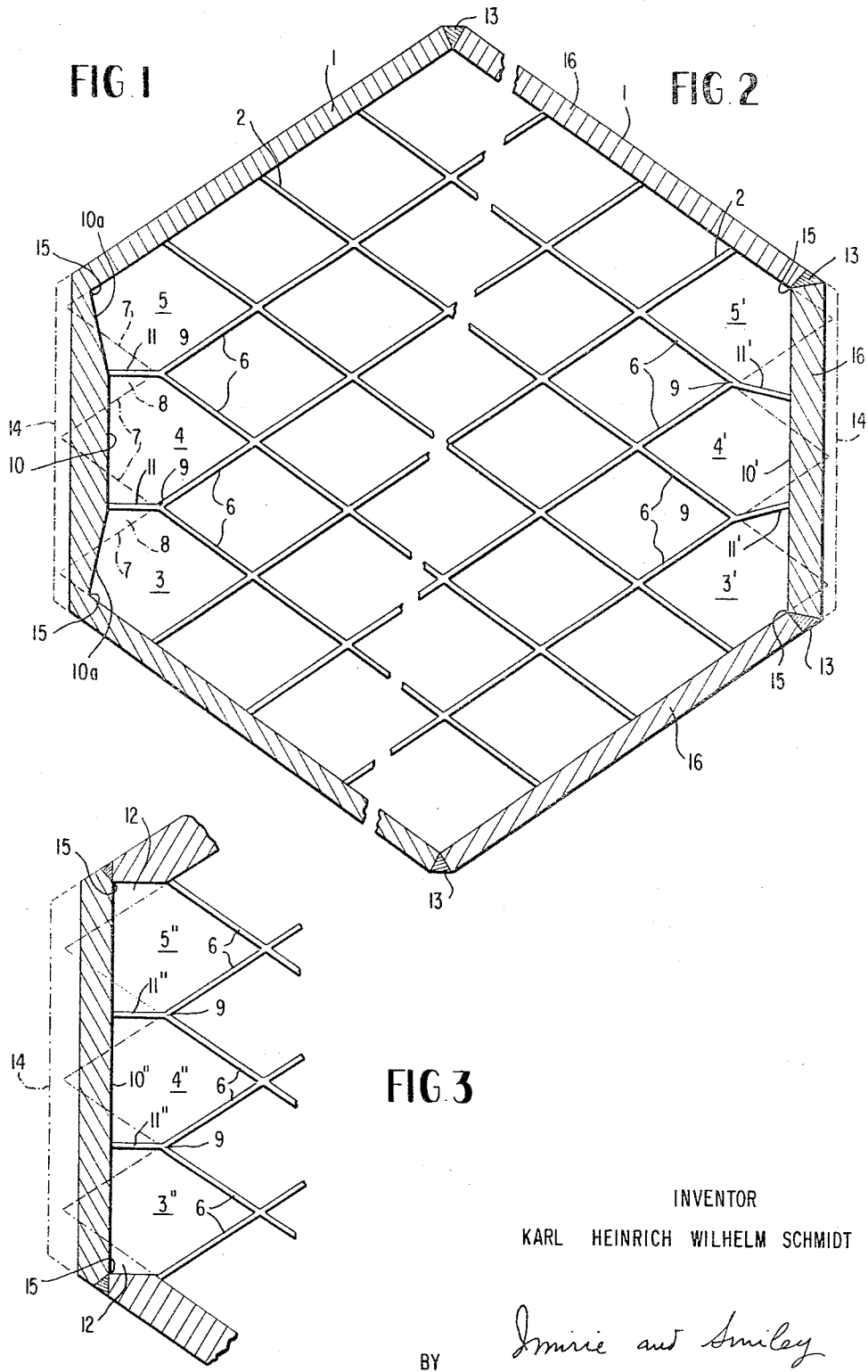

3,302,591
DOUGH DIVIDER
Karl Heinrich Wilhelm Schmidt, 28 Fohrsterstrasse,
Alfeld (Leine), Germany
Filed Oct. 9, 1964, Ser. No. 402,870
5 Claims. (Cl. 107—15)

The present invention relates to a dough divider and working head which incorporates a knife grid forming a field of contiguous working compartments of rhombus-shaped cross section. The compartments which lie furthest on the outside and which are adapted for the round and longitudinal working of the dough, are bounded by blades of the knife grid which form an acute angle with each other and by the adjacent inner surfaces of the circumferential ring of the head. These last-mentioned surfaces likewise form acute angles with each other, apexes of these angles partly being directed toward the interior of the ring and partly toward the circumference of the ring. These outermost compartments thus have the same rhombus-shaped cross-sectional configuration as the other compartments.

Experience has shown that when the dough is worked, the outer corners of the angles, the apexes of which are directed toward the circumference of the ring, are not completely filled with dough, so that the pieces of dough which come from these outermost compartments will weigh less than the pieces of dough which come from the other compartments. In order to avoid this drawback, the concave corners may be made less pointed. This, however, still leaves angles the apexes of which project into the interior of the ring. Consequently, the circumferential ring has a relatively complicated configuration.

It is, therefore, an object of the present invention to provide a dough dividing and working head which overcomes the above drawbacks and, with this object in view, the present invention resides, basically, in a head which has means forming a circumferential ring and a knife grid within the ring, this knife ring forming a field of contiguous working compartments of rhombus-shaped cross sections. Each compartment has acute apexes in consequence of which the grid can be considered as having two opposite sides toward which the acute apexes of the compartments are directed. According to the present invention, the circumferential ring has, at the two sides toward which the acute angles of the compartments are directed, flat inner surfaces, and at least one, and preferably at least two, of the working compartments on each side have their acute apexes spaced from the corresponding flat inner surfaces of the ring. The head furthermore has partition means that extend from these spaced acute apexes to the corresponding inner surface, so that the oblique apexes of the ring which, in the prior art heads, extend inwardly and, together with the knife grid, form the outermost lateral compartments, are completely eliminated. Also eliminated are the acute angle apexes at the very edge of the ring.

Additional objects and advantages of the present invention will become apparent upon consideration of the following description when taken in conjunction with the accompanying drawings in which:

FIGURE 1 is a fragmentary horizontal sectional plan view of a head according to the present invention.

FIGURE 2 is a fragmentary view similar to FIGURE 1 but shows a modified embodiment of the head. FIGURES 1 and 2 are illustrated complementarily in that these figures together may be considered as illustrating the configuration of an entire head.

FIGURE 3 is a fragmentary view similar to FIGURES 1 and 2 and shows yet another modified embodiment of a head according to the present invention.

Referring now to the drawings and to FIGURES 1 and 2 thereof in particular, there is shown a dough divider and working head having a circumferential ring 1 and a knife grid 2 within this ring, this knife grid forming a field of contiguous working compartments of rhombus-shaped cross section. As is apparent from the figures, each compartment has acute apexes in consequence of which the grid has two opposite sides—the left of FIGURE 1 and the right of FIGURE 2—toward which the acute apexes are directed. The laterally outermost compartments are indicated at 3, 4, 5 (FIGURE 1) and 3', 4', 5' (FIGURE 2). In order to afford a comparison of the present invention with a prior art head, such prior art head is shown in phantom lines, from which the typical prior art divider head will be seen to have its outermost compartments founded, in part, by the inner surfaces 7 which form an acute angle with each other. It will be appreciated that even if the outwardly extended apexes are made less acute, there is still the danger that the corners will not be filled with dough.

In the prior art heads, the inwardly projecting apexes 8 formed between the surfaces 7 abut the acute apexes 9 of the outermost compartments constituted wholly by the blades 6 of the knife grid 2. These apexes 8 thus project interiorly into the space within the ring 1, so as to bring about the above-discussed drawbacks. Also, it will be seen that so much of the ring which constitutes the portions forming the apexes 8 and surfaces 7 presents a relatively broad undersurface, which can result in squeezing the dough when the head is brought down onto the doughy mass.

According to the present invention—shown in full lines—the ring 1 is provided at those sides toward which the acute apexes of the compartments point with flattened inner surfaces 10, 10'. The acute apexes 9 of the laterally outwardmost compartments constituted wholly by the blades 6 of the knife grid 2 are spaced from these inner surfaces 10, 10', and the head is provided with additional blade-like partitions 11, 11', which extend between these apexes 9 and the inner surfaces 10, 10'.

By virtue of the above arrangement, there is provided a substantially flat inner surface 10 (FIGURE 1) or a completely flat inner surface 10' (FIGURE 2) at the sides of the ring 1, which surfaces extend between the vertical lines 15 of the inner contour of the head. The distance between the apexes 9 and the surfaces 10, 10', i.e., the distances to be bridged by the partitions 11, 11', are selected to be such that the volume of the compartments 3, 4, 5; 3', 4', 5' is the same as that of each of the other compartments. This means, in the case of FIGURES 1 and 2 and with the cross-sectional area of the partitions 11, 11' being deemed negligible, a length equal to approximately one quarter of the length of the longer diagonal of the rhombus of each compartment. In practice, a good approximation of length will, in the case of FIGURE 2, be 27.5% of the length of the longer diagonal, the length of the distance in question being independent of the length of the shorter diagonal of each rhombus-shaped compartment.

The embodiment of FIGURE 3 differs from the above-described embodiments in that the laterally outermost compartments 3", 4", 5" are made to have the proper volume by the elimination of prismatic sections from the sides of the ring 1 adjacent the corner compartments 3" and 5" to form recesses 12 communicating with and constituting part of the respective corner compartments. As in the other embodiments, the partitions 11" extend from the apexes 9 to the inner surface 10" which, as in the case of the surface 10' of FIGURE 2, is shown to be flat throughout its entirety. In the embodiment of FIGURE 3, the distance between the apexes 9 and the surface 10"

is equal to precisely one quarter of the length of the longer diagonal of each rhombus-shaped compartment.

In the embodiments of FIGURES 1 and 3, the partitions 11, 11" bisect the angles between the adjacent blades 6 constituting the apexes 9 from which the respective partitions extend.

In order that the volume of the laterally outermost compartments be kept equal to the volume of the other compartments, those portions 10a of the surface 10 (FIGURE 1) which bounds the corner chambers 3 and 5 are swung slightly outwardly, as shown, or they may be slightly arched, while in the case of FIGURE 2, the volumetric compensation is attained by swinging the partitions 11' slightly inwardly with respect to the longer diagonal of the rhombus shape, i.e., toward the center compartment 4', so that these partitions 11' no longer bisect the angles of the corresponding apexes 9.

Since the outer ring 1 is constituted by essentially flat pieces, and fully flat pieces in the case of the embodiment of FIGURE 2, the ring 1 can be in the form of a hexagon which is constituted by six side pieces 16 that are suitably secured at their ends, such as by welded connections 13. The use of flat pieces also avoids the necessity of machining the individual pieces. This also simplifies the manufacture of the pressure plunger used with the head since the latter may likewise have a hexagonal configuration.

The composite of FIGURES 1 and 2 also shows that the width of a head according to the present invention is less than the width of a prior art head whose outermost configuration is, as stated above, represented in phantom lines. The total width of the prior art head is that represented by the distance between the outer flanks 14 (FIGURES 1 and 2).

The length of the laterally outermost compartments 3, 4, 5; 3', 4', 5'; 3", 4", 5" is shortened by approximately one quarter as compared to the other compartments. While this might tend to be a drawback if the same head is to be used for both circular and longitudinal working, any disadvantage can be overcome by making the rhombus-shaped configuration of the compartments suitably flat. In practice, however, the head according to the present invention is intended primarily for circular working.

It will be understood that the above description of the present invention is susceptible to various modifications, changes and adaptations, and the same are intended to be comprehended within the meaning and range of equivalents of the appended claims.

What is claimed is:

1. A dough divider and working head comprising:
   means forming a circumferential ring;
   a knife grid within said ring forming a field of contiguous working compartments of rhombus-shaped cross section, each of which compartments has acute apexes in consequence of which said grid has two opposite sides toward which the acute apexes of the compartments are directed;
   said ring having, at the two sides toward which said acute apexes of said compartments are directed, at least substantially flat inner surfaces;
   at least one of said compartments on each side having its acute apex spaced from the corresponding flat inner surface of said ring; and
   partition means extending from said spaced apexes to the corresponding inner surface, thereby to form a plurality of laterally outermost compartments having a rhomboidal cross section differing from said rhombus-shaped cross section of the remaining compartments, each of said outermost compartments having a cross-sectional area substantially equal to such area of the remaining compartments.

2. A dough divider and working head as defined in claim 1 wherein there are at least two rhombus-shaped compartments having two acute apexes spaced from each substantially flat inner surface of said ring thereby to form, adjacent each substantially flat inner surface, at least three of said rhomboidal compartments.

3. A dough divider and working head as defined in claim 2 wherein said partitions extend substantially parallel to the long diagonal of the rhombus-shaped compartments and divide the area into a center and two corner compartments bounded by each of said flat inner surfaces, wherein so much of each of said substantially flat inner surfaces of said ring which bounds a center compartment between two of said partitions is a flat surface portion that is at right angles to said partitions, and wherein so much of said substantially flat inner surface of said ring which bounds a corner compartment is a flat surface portion which is inclined outwardly with respect to the adjacent flat surface portion.

4. A dough divider and working head as defined in claim 2 wherein said inner surfaces are flat throughout their entire area, wherein there are two partitions and hence three laterally outermost compartments on each lateral side, and wherein said partitions are oriented inwardly with respect to the longer diagonal of the rhombus-shaped compartments.

5. A dough divider and working head as defined in claim 2 wherein said ring is provided, in the region of said flat inner surfaces, with recesses which communicate with and constitute part of respective corner compartments.

References Cited by the Examiner

FOREIGN PATENTS 225,131  12/1962  Austria.

WALTER A. SCHEEL, *Primary Examiner.*

J. SHEA, *Assistant Examiner.*